United States Patent
Gabor et al.

(10) Patent No.: US 9,457,777 B2
(45) Date of Patent: Oct. 4, 2016

(54) SYSTEM AND METHOD FOR APPLYING REGENERATIVE BRAKING DURING HIGH FRICTION COEFFICIENT BRAKING

(71) Applicant: Ford Global Technologies, LLC, Dearborn, MI (US)

(72) Inventors: Daniel A. Gabor, Canton, MI (US); Dale Scott Crombez, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1 day.

(21) Appl. No.: 14/332,791

(22) Filed: Jul. 16, 2014

(65) Prior Publication Data
US 2016/0016565 A1   Jan. 21, 2016

(51) Int. Cl.
| B60T 8/1763 | (2006.01) |
| B60L 7/18 | (2006.01) |
| B60T 1/10 | (2006.01) |
| B60T 13/58 | (2006.01) |

(52) U.S. Cl.
CPC ............ B60T 8/1763 (2013.01); B60L 7/18 (2013.01); B60T 1/10 (2013.01); B60T 8/17636 (2013.01); B60T 13/586 (2013.01); B60T 2270/602 (2013.01); B60T 2270/604 (2013.01); Y10S 903/947 (2013.01)

(58) Field of Classification Search
CPC ...... B60T 8/1763; B60T 1/10; B60T 13/586; B60T 8/17636; B60T 2270/604; B60T 2270/602; B60L 7/18; Y10S 903/947
USPC .................. 701/71, 70, 22; 903/947
See application file for complete search history.

(56) References Cited

U.S. PATENT DOCUMENTS

| 5,615,933 | A  * | 4/1997 | Kidston ................. B60L 3/102 180/65.1 |
| 6,231,134 | B1 * | 5/2001 | Fukasawa et al. ............ 303/152 |
| 6,687,593 | B1 * | 2/2004 | Crombez et al. ............... 701/71 |
| 6,709,075 | B1 * | 3/2004 | Crombez et al. ............ 303/152 |
| 7,922,265 | B1 * | 4/2011 | Cottrell, V ................ B60T 1/10 303/113.1 |
| 8,744,713 | B2 * | 6/2014 | Kim et al. ...................... 701/70 |
| 2013/0049945 | A1 * | 2/2013 | Crombez et al. ............ 340/453 |
| 2013/0173127 | A1 * | 7/2013 | Nakatsu et al. ................ 701/70 |
| 2013/0211644 | A1 * | 8/2013 | Yokoyama et al. ........... 701/22 |
| 2013/0297165 | A1 * | 11/2013 | Crombez et al. ............... 701/70 |
| 2014/0277983 | A1 * | 9/2014 | Bayar et al. .................... 701/71 |

* cited by examiner

*Primary Examiner* — Brian P Sweeney
(74) *Attorney, Agent, or Firm* — David Kelley, Esq.; Tung & Associates

(57) ABSTRACT

A system for applying regenerative braking during high friction coefficient braking of a vehicle includes at least one controller; at least one braking sensor interfacing with the at least one controller; a vehicle powertrain interfacing with the at least one controller; a brake pedal interfacing with the at least one controller; vehicle friction brakes interfacing with the at least one controller; and the at least one controller applies anti-lock braking torque to the vehicle brakes and simultaneously applies regenerative braking torque to the vehicle powertrain responsive to input from the at least one braking sensor. A method for applying regenerative braking during high friction coefficient braking of a vehicle is also disclosed.

6 Claims, 1 Drawing Sheet

SYSTEM AND METHOD FOR APPLYING REGENERATIVE BRAKING DURING HIGH FRICTION COEFFICIENT BRAKING

FIELD

Illustrative embodiments of the disclosure generally relate to regenerative braking in vehicles. More particularly, illustrative embodiments of the disclosure relate to a system and method for applying regenerative braking during anti-lock friction braking on surfaces which are characterized by a high friction coefficient.

BACKGROUND OF THE INVENTION

To improve fuel economy, some types of vehicles such as hybrid electric vehicles (HEVs) may provide regenerative (regen) braking, in which kinetic energy is converted by an electric machine into storable energy during braking and then made available for propulsion. Regenerative braking is one of the enablers of hybrid vehicle technologies. It has been found that a 15%~30% fuel economy improvement over a non-regenerative braking-capable vehicle can be achieved using regenerative braking.

An anti-lock braking system (ABS) an automobile safety system that allows the wheels on a motor vehicle to maintain traction with a road surface according to driver inputs during braking. Anti-lock braking prevents the wheels of the vehicle from locking up (ceasing rotation) to avoid uncontrolled skidding. Anti-lock braking generally offers improved vehicle control and decreases stopping distances on dry and slippery surfaces. On loose surfaces such as gravel or snow-covered pavement, anti-lock braking can significantly increase braking distance although still improving vehicle control.

A system and method for applying regenerative braking during anti-lock friction braking on surfaces which are characterized by a high friction coefficient may be desirable for some applications.

SUMMARY

Illustrative embodiments of the disclosure are generally directed to a system for applying regenerative braking during high friction coefficient braking of a vehicle. An illustrative embodiment of the system includes at least one controller; at least one braking sensor interfacing with the at least one controller; a vehicle powertrain interfacing with the at least one controller; a brake pedal interfacing with the at least one controller; vehicle friction brakes interfacing with the at least one controller; and the at least one controller applies anti-lock braking torque to the vehicle brakes and simultaneously applies regenerative braking torque to the vehicle powertrain responsive to input from the at least one braking sensor.

Illustrative embodiments of the disclosure are further generally directed to a method for applying regenerative braking during high friction coefficient braking of a vehicle. An illustrative embodiment of the method includes applying anti-lock braking and applying regenerative braking simultaneous with applying anti-lock braking.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
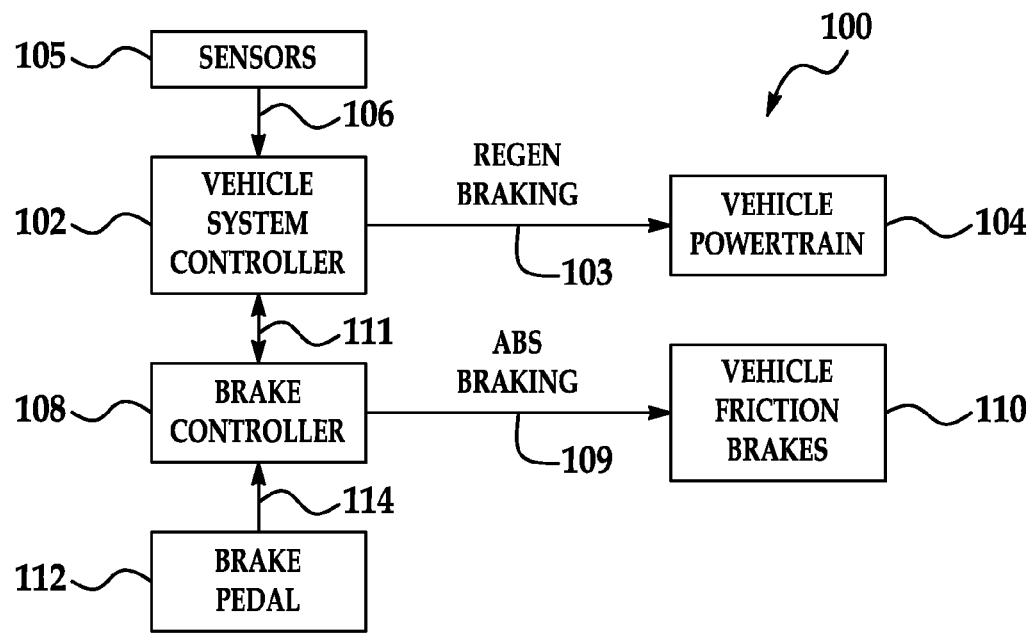
FIG. 1 is a functional block diagram of an illustrative embodiment of a system for applying regenerative braking during high friction coefficient braking.

Referring initially to FIG. 1, an illustrative embodiment of a system for applying regenerative braking during high friction coefficient vehicle braking, hereinafter system, is generally indicated by reference numeral 100. In some embodiments, the system 100 may be implemented in an HEV (Hybrid Electric Vehicle), for example and without limitation. The system 100 may be adapted to apply regenerative braking to a vehicle powertrain during application of anti-lock braking to the friction brakes of a vehicle. Accordingly, the system 100 may facilitate regenerative braking simultaneously with application of anti-lock braking to prevent wheel lock and improve stopping distance, particularly on road surfaces having a high friction coefficient.

The system 100 may include a vehicle system controller 102. A vehicle powertrain 104 may interface with the vehicle system controller 102. Braking sensors 105 may interface with the vehicle system controller 102. The braking sensors 105 may include sensors which detect the braking conditions of the vehicle, such as wheel slip sensors and roadway surface friction sensors, for example and without limitation.

A brake controller 108 may interface with the vehicle system controller 102. A brake pedal 112 may interface with the brake controller 108. Vehicle friction brakes 110 of the vehicle may interface with the brake controller 108.

As it is depressed at the onset of vehicle braking, the brake pedal 112 transmits a brake signal 114 to the brake controller 108. The braking sensors 105 transmit braking sensor signals 106 to the vehicle system controller 102. In the event that the friction coefficient (Mµ) of the roadway surface as indicated by the braking sensor signals 106 exceeds a minimum friction coefficient threshold level (such as 0.8, for example and without limitation), the brake controller 108 may transmit an ABS braking signal 109 to the vehicle friction brakes 110. Accordingly, the vehicle friction brakes 110 apply anti-lock braking to the wheels of the vehicle to decrease the stopping distance of the vehicle without skidding of the vehicle tires on the roadway surface. Simultaneously, the vehicle system controller 102 may transmit regenerative braking signals 103 to the vehicle powertrain 104. In the regenerative braking mode, the vehicle powertrain 104 generates electrical current which may be stored in a suitable electrical storage facility (not shown) for continued propulsion of the vehicle.

In some embodiments, the vehicle system controller 102 may be programmed to apply the regenerative braking to the vehicle powertrain 104, and the brake controller 108 may be programmed to apply the ABS braking to the vehicle friction brakes 110, as defined proportions of the total brake torque which is applied to the vehicle wheels and/or the vehicle axle during the braking event. For example and without limitation, in some embodiments, the vehicle system controller 102 may be programmed to apply regenerative braking torque to the vehicle powertrain 104 at a magnitude of about 20% of the total brake torque. Thus, the brake controller 108 may be programmed to apply ABS braking to the vehicle friction brakes 110 at a magnitude of about 80% of the total brake torque during the braking event.

Figure 2:
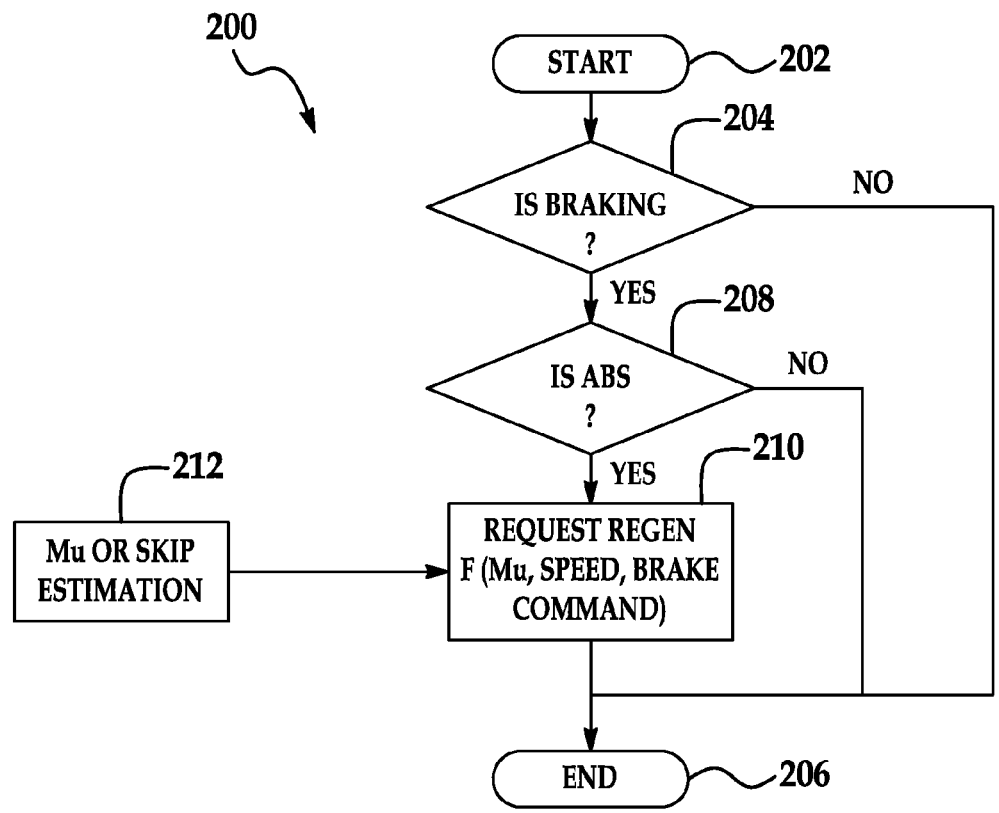
FIG. 2 is a flow diagram of an illustrative embodiment of a method for applying regenerative braking during high friction coefficient braking.

Referring next to FIG. 2, a flow diagram 200 of an illustrative embodiment of a method for applying regenerative braking during high friction coefficient braking is shown. The method begins at block 202. At block 204, a determination may be made as to whether a braking event is occurring. If a braking event is not occurring, then the method may end at block 206. If a braking event is occurring, then a determination may be made as to whether ABS braking is occurring at block 208. If ABS braking is not occurring at block 208, then the method may end at block 206.

If ABS braking is occurring at block 208, then a request for regenerative braking may be made at block 210. A friction coefficient (Mμ) or slip estimation of the roadway surface may be made at block 212. Accordingly, in the event that the friction coefficient of the roadway surface as indicated by the friction coefficient or slip estimation at block 212 exceeds a minimum friction coefficient threshold level (such as about 0.8, for example and without limitation), regenerative braking and anti-lock braking may be simultaneously applied to the vehicle braking system. The method may end at block 206.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A system for applying regenerative braking during high friction coefficient braking of a vehicle including at least one controller and at least one braking sensor, a vehicle powertrain, a brake pedal and vehicle friction brakes each interfacing with the at least one controller; comprising:
said at least one controller configured to apply anti-lock braking torque to the vehicle brakes while simultaneously applying regenerative braking torque to the vehicle powertrain responsive to input from said at least one braking sensor, the controller configured to apply the regenerative braking torque only in response to a determination that the anti-lock braking torque is being applied and a friction coefficient of a roadway surface exceeds a minimum friction coefficient threshold of about 0.8.

2. A system for applying regenerative braking during high friction coefficient braking of a vehicle including at least one controller and at least one braking sensor, a vehicle powertrain, a brake pedal and vehicle friction brakes each interfacing with the at least one controller; comprising:
the at least one controller applies the anti-lock braking torque to the vehicle brakes at a magnitude of about 80% of total brake torque while simultaneously applying regenerative braking torque to the vehicle powertrain at a magnitude of about 20% of total brake torque.

3. A method for applying regenerative braking during high friction coefficient braking in a vehicle, comprising:
applying regenerative braking simultaneous with applying anti-lock braking, the regenerative braking torque applied only in response to a determination that the anti-lock braking torque is being applied, and in response to a minimum friction coefficient threshold of a roadway surface of about 0.8.

4. A method for applying regenerative braking during high friction coefficient braking in a vehicle, comprising:
applying regenerative braking simultaneously with applying anti-lock braking as defined proportions of total brake torque comprises applying anti-lock braking at a magnitude of about 80% of total brake torque and simultaneously applying regenerative braking torque at a magnitude of about 20% of the total brake torque.

5. A method for applying regenerative braking during high friction coefficient braking in a vehicle, comprising:
sensing whether a braking event is occurring;
sensing whether an anti-lock braking event is occurring if the braking event is occurring; and
applying regenerative braking simultaneous with applying anti-lock braking when the minimum friction coefficient threshold level is about 0.8.

6. A method for applying regenerative braking during high friction coefficient braking in a vehicle, comprising:
sensing whether a braking event is occurring;
sensing whether an anti-lock braking event is occurring if the braking event is occurring; and
applying regenerative breaking simultaneous with applying anti-lock braking as defined proportions of total brake torque comprises applying anti-lock braking at magnitude of about 80% of total brake torque and simultaneously applying regenerative braking torque at a magnitude of about 20% of the total brake torque.

* * * * *